United States Patent
Kossin et al.

(10) Patent No.: US 8,613,030 B2
(45) Date of Patent: Dec. 17, 2013

(54) TRANSMISSION OF UNCOMPRESSED VIDEO FOR 3-D AND MULTIVIEW HDTV

(76) Inventors: Philip S Kossin, Clifton, NJ (US); John E Nelson, Redondo Beach, CA (US)

( * ) Notice: Subject to any disclaimer, the term of this patent is extended or adjusted under 35 U.S.C. 154(b) by 725 days.

(21) Appl. No.: 12/451,688

(22) PCT Filed: May 27, 2008

(86) PCT No.: PCT/US2008/064914
§ 371 (c)(1),
(2), (4) Date: Apr. 26, 2010

(87) PCT Pub. No.: WO2008/148107
PCT Pub. Date: Dec. 4, 2008

(65) Prior Publication Data
US 2010/0235871 A1    Sep. 16, 2010

Related U.S. Application Data

(60) Provisional application No. 60/940,434, filed on May 28, 2007.

(51) Int. Cl.
*H04N 7/173* (2011.01)

(52) U.S. Cl.
USPC .......... 725/105; 725/106; 725/107; 725/108; 725/109; 725/110; 725/111; 725/112; 725/113; 725/114; 725/115; 725/116; 725/117; 725/118; 725/119; 725/120; 725/121; 725/122; 725/123; 725/124; 725/125; 455/403; 455/430; 370/214; 370/249; 370/316; 348/169; 348/170; 348/171; 348/172; 348/208.2; 348/208.3; 348/208.4; 386/326; 386/327; 386/328

(58) Field of Classification Search
USPC ................. 725/105, 106–125; 455/403, 430; 370/214, 249, 316; 348/169–172, 348/208.2–208.4; 386/326–328
See application file for complete search history.

(56) References Cited

U.S. PATENT DOCUMENTS

| | | | | |
|---|---|---|---|---|
| 5,914,683 A * | 6/1999 | O'Conner | ...... | 342/127 |
| 5,982,333 A * | 11/1999 | Stillinger et al. | ...... | 343/766 |
| 6,177,950 B1 * | 1/2001 | Robb | ...... | 348/14.01 |
| 6,702,459 B2 * | 3/2004 | Barnes et al. | ...... | 378/197 |
| 7,746,223 B2 * | 6/2010 | Howarter et al. | ...... | 340/506 |
| 8,069,465 B1 * | 11/2011 | Bartholomay et al. | ...... | 725/116 |
| 8,077,080 B2 * | 12/2011 | Lam et al. | ...... | 342/174 |
| 8,082,564 B2 * | 12/2011 | Wang et al. | ...... | 725/32 |
| 2003/0156188 A1 * | 8/2003 | Abrams, Jr. | ...... | 348/51 |
| 2003/0224801 A1 * | 12/2003 | Lovberg et al. | ...... | 455/454 |
| 2005/0231041 A1 * | 10/2005 | Brown | ...... | 307/106 |
| 2005/0234679 A1 * | 10/2005 | Karlsson | ...... | 702/181 |
| 2005/0237264 A1 * | 10/2005 | Durham et al. | ...... | 343/909 |
| 2006/0088203 A1 * | 4/2006 | Boca et al. | ...... | 382/153 |
| 2007/0053447 A1 * | 3/2007 | Loheit et al. | ...... | 375/259 |
| 2007/0090973 A1 * | 4/2007 | Karlsson et al. | ...... | 340/995.22 |
| 2010/0017047 A1 * | 1/2010 | Sanders-Reed | ...... | 701/3 |
| 2010/0207834 A1 * | 8/2010 | Wahlberg et al. | ...... | 343/762 |
| 2012/0207223 A1 * | 8/2012 | Xia et al. | ...... | 375/240.24 |

\* cited by examiner

*Primary Examiner* — Nasser Goodarzi
*Assistant Examiner* — Paul Graham
(74) *Attorney, Agent, or Firm* — Lewis Brisbois; Bisgaard & Smith LLP; Jon E Hokanson

(57) ABSTRACT

A wireless video camera system including a single or dual HDTV digital camera; a system for the wireless transmission of uncompressed single or multiple SMPTE 292M, HDSDI data streams over an RF band; and automatic self-pointing transmitting and receiving antennas.

20 Claims, 5 Drawing Sheets

TRANSMISSION OF UNCOMPRESSED VIDEO FOR 3-D AND MULTIVIEW HDTV

TECHNICAL FIELD

This invention relates to live broadcast of 3-D or standard HDTV

BACKGROUND ART

The following acronyms are used in this application.
292M—a STMPE standard
BPSK—binary phase shift keying
CDR—clock and data recovery
DPSK—differential phase shift keying
DRO—dielectric resonating oscillator
FSK—frequency shift keying
GPS—global positioning system
HDSDI—high definition serial interface
HDTV—high definition television
MPEG—Motion Picture Experts Group
OFDM—orthogonal frequency division multiplexing
OQPSK—offset quadrature phase shift keying
QPSK—quadrature phase shift keying
SMTPE—Society of Motion Picture and Television Engineers Wireless cameras have been used for live broadcast of television to provide coverage of events in remote or urban locations. Typically the camera transmits compressed data to a nearby vehicle which then re-transmits the data through a satellite link.

Current technology allows for capture and digitization of video conforming to the high-definition television (HDTV) standard. The video data is compressed using an encoding method such as MPEG 2, which greatly reduces the necessary bandwidth of the wireless link. Methods such as OFDM can be used to overcome multipath, and the modulated waveform can then be used to transmit the data in an unlicensed band such as the 2.4 or 5.8 Ghz ISM band.

It is possible to mount two or more HDTV cameras side by side to obtain multi-view video. If the video data is reproduced live at a remote location, this can give the viewer the sensation that he is present at the live location. For example, if two cameras are placed next to each other, the resulting HDTV stream can be used to reproduce three-dimensional (3-D) television. In order for the 3-D effect to be experienced by the viewer, the timing relationship between the two video streams must be preserved.

Current wireless systems for digital television compress the video signal using MPEG 2 or similar compression methods. With multi-view video, this compression results in the loss of the interrelationship and synchronization between the individual channels. In order to preserve the timing relationship between the multiple video streams, and to allow for other processing, which sometimes cannot be done at the same location as the camera, it is necessary to transmit uncompressed HDTV video data from one or multiple cameras. The uncompressed data rate for digital HDTV is typically 1.485 Gbps, in accordance with the SMPTE 292M standard. For the transmission of multi-view HDTV, multiple 1.485 Gbps data streams would be required. For 3-D HDTV broadcasting, it would be necessary to transmit two, 1.485 Gpbs data streams with an aggregate throughput of nearly 3 Gbps.

Typically, such high throughputs can only be handled using coax or fiber optic cable. However, these cables encumber the camera operator who must be able to move continuously, and require significant advance preparation. In some venues such as field events or in crowded environments it is not feasible to use a camera tethered with a cable. A wireless system is needed to transmit the digital video from the camera location to a second relay station which would be at least 100 yards away which would then send the data via optical fiber or satellite link. Conventional wireless links in the 2.4 Ghz and 5.3 Ghz unlicensed bands cannot support such high data rates. Microwave systems above 50 GHz which can support such throughput require rigid platforms, precise pointing, and are not well suited to a man-mounted, portable system.

Development of a wireless video camera capable of transmission of uncompressed high definition digitized video represents a great improvement in the field of video engineering and satisfies a long felt need of video engineers, producers and directors.

DISCLOSURE OF INVENTION

This invention is an apparatus for transmission of uncompressed video signals comprising: at least one video camera outputting a video signal; a transmitter connected to the video camera; a transmit gimbal; a transmit horn antenna connected to the transmitter and mounted on the transmit gimbal; a receive gimbal located at a distance from the transmit gimbal; a receive horn antenna mounted on the receive gimbal; a receiver connected to the receive horn antenna; and a tracking system for keeping the horn antennas continuously pointed at each other.

The tracking system comprises: position detecting means on the gimbals for detecting the positions of the gimbals; position controlling means on the gimbals for controlling the positions of the gimbals; a radio frequency transceiver; an antenna connected to the transceiver; a computer connected to the position detecting means, the position controlling means, the radio frequency transceiver; the transmitter and the receiver; and software on the computer for sending and receiving data and control signals via the radio frequency transceiver; continuously detecting the positions of the gimbals; and continuously controlling the positions of the gimbals so that signal strength of the video data signal at the receiver is maximized.

The preferred embodiment of this invention comprises: a first video camera outputting a first video signal; a second video camera outputting a second video signal; a first transmitter connected to the first video camera; a second transmitter connected to the second video camera; a duplexer/combiner connected to the transmitters or the video cameras; the duplexer/combiner combining the first and second video signals into a combined video data signal; a transmit gimbal; a transmit horn antenna connected to the transmitter or the duplexer combiner and mounted on the transmit gimbal; a receive gimbal located at a distance from the transmit gimbal; a receive horn antenna mounted on the receive gimbal; a duplexer/splitter; the duplexer/splitter splitting the combined video data signal into the first video signal and the second video signal; a first receiver; a second receiver; the receive horn antenna connected to the duplexer/splitter or the receivers; the video signals being output by the duplexer/splitter or the receivers; and a tracking means for keeping the horn antennas continuously pointed at each other.

The beamwidth of the horn antennas is preferably between 3 and 8 degrees. Preferably the tracking system operates by detecting the positions of the horn antennas which results in maximum signal strength. Alternatively it could operate by detecting the positions of the horn antennas in three dimensional space. Alternatively the tracking system operates by detecting the change in location of the transmit horn antenna in three dimensional space.

The invention operates by: capturing images with the video camera and outputting the images as a video signal; amplifying and modulating the video signal onto a microwave carrier in the transmitter to produce a video data signal; transmitting the video data signal from the transmit horn antenna; receiving the video data signal at the receive horn antenna; demodulating the video data signal in the receiver; outputting the video signal; and keeping the horn antennas continuously pointed at each other with a tracking system.

The invention may further comprise: providing a duplexer/combiner; connecting the duplexer/combiner between the video camera and the transmit horn antenna; providing a duplexer/splitter; and connecting the duplexer/splitter after the receive horn antenna. In this case video signals are combined in the duplexer/combiner and split in the duplexer/splitter.

Keeping the horn antennas continuously pointed at each other involves: sending and receiving data and control signals via the radio frequency transceiver; continuously detecting the positions of the gimbals; and continuously controlling the positions of the gimbals so that signal strength of the video data signal at the receiver is maximized.

The goal of the present invention is to overcome the drawbacks of the prior art, resulting in a wireless video camera capable of transmission of uncompressed high definition digitized video. The apparatus enables the live transmission of multi-view video such as 3-D video from the camera operator to a second station located at least 100 yards away. Because the video output of the multiple video streams is uncompressed, the timing and synchronization interrelationship is preserved and the multiview video can be reproduced for the viewing audience resulting in a 3-D or multiview effect. The wireless video system is light and portable enough to be worn by the camera operator. The system operates in a millimeter wavelength band such as the unlicensed 60 GHz band, and features automated pointing so that the camera operator does not need to concern himself with pointing the antenna.

The above goal can be attained with a wireless camera including two (or more) HDTV video cameras, two (or more) digital modulators, two (or more) radio transmitters with their outputs combined to one horn antenna, mounted to a two-axis pointing mechanism, and a tracking algorithm running in a control processing unit (such as a PC). All of these systems are included in one unit forming the wireless video camera of this invention.

Additionally, a remote receive unit comprising a horn antenna mounted on a two axis pointing mechanism, a tracking algorithm running in a control processing unit, a splitter providing inputs to two (or more) receivers from the single horn antenna, a receiver strength indicator signal from one of the receivers which is fed to the control processing unit, and a secondary, bi-directional low-bandwidth radio control link to feed telemetry data back to the wireless video camera for pointing and tracking. The receive antenna unit can also be fitted with a two-axis pointing and tracking mechanism. Both the transmit and receive antennas are thus automatically pointed at each other regardless of the movement of the operator carrying the equipment. The transmitter and receiver can be carried as manpack units and operated while being worn or carried, or can be mounted on a moving platform such as a land or air vehicle.

An appreciation of the other aims and objectives of the present invention and an understanding of it may be achieved by referring to the accompanying drawings and description of a preferred embodiment.

BEST MODE FOR CARRYING OUT INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Referring to the 1-4, the transmitter portion 10 of the invention comprises two (or more) HOW cameras 20-1, 20-2 which generate an uncompressed HDSDI waveform 30-1a, 30-2a. These signals 30-1a, 30-2a are typically at a data rate of 1.485 Gbps for each HDSDI signal. The two HDSDI signals 30-1a, 30-2a are then both fed to digital modulators (incorporated into the transmitters 250) and modulated onto carriers. The preferred carriers are in the 60 GHz unlicensed band. Modulation such as OOSK, FSK, BPSK, DPSK, QPSK, OQPSK, would typically be used. Alternatively, they could be modulated onto a carrier in any microwave band that has enough bandwidth to carry these signals. For example, the 70 GHz licensed band could also be used.

The output of the modulators is then amplified to a power level that is high enough to close the link but which is within the regulations of the band being used. Typically a power level of 10 to 100 mw will be sufficient. The amplified output of the two (or more) modulators are then combined using a duplexer/combiner 260 or other power combiner, and the output is fed to a single antenna 270a.

Figure 1:
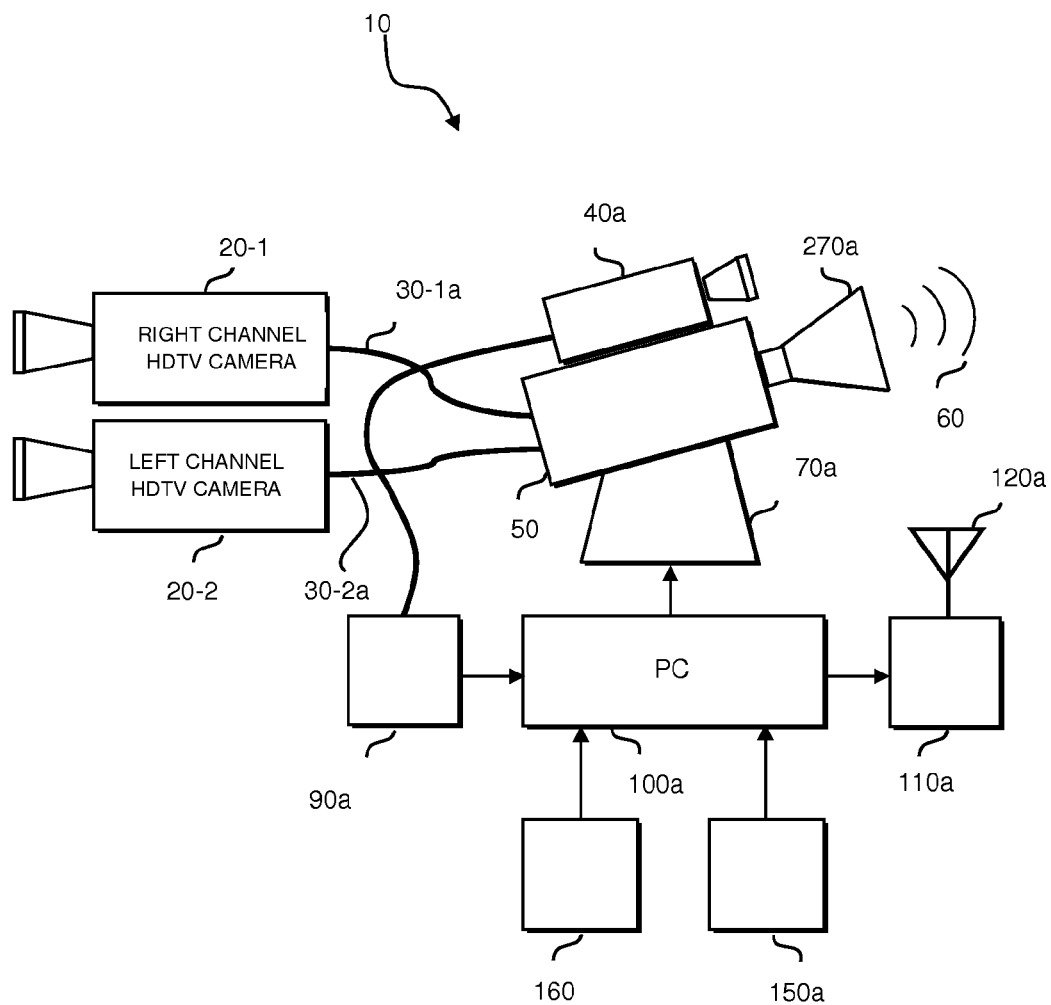
FIG. 1 is a functional diagram of a wireless 3-D HDTV transmitter unit of the invention.
Figure 2:
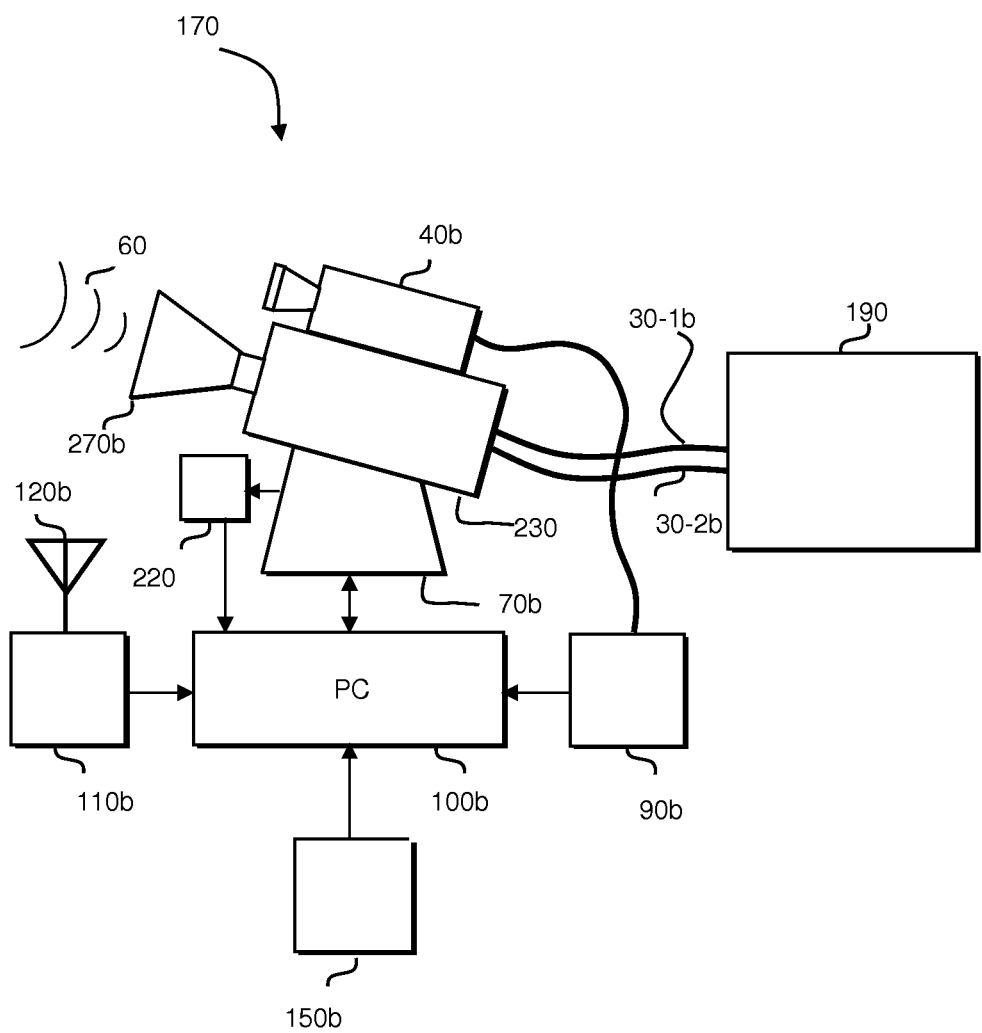
FIG. 2 is a functional diagram of a wireless 3-D HDTV receiver unit of the invention.
Figure 3:
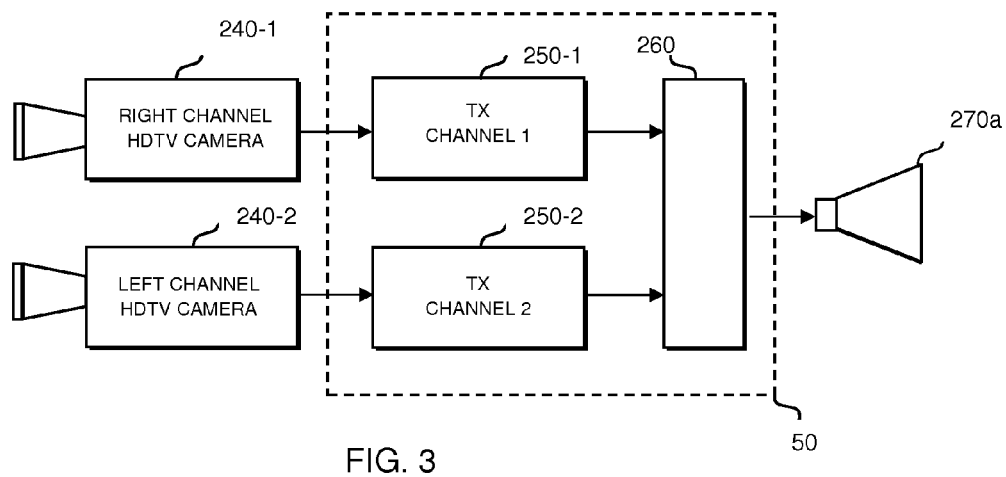
FIG. 3 is a functional block diagram of a wireless 3-D HDTV receiver unit of the invention.
Figure 4:
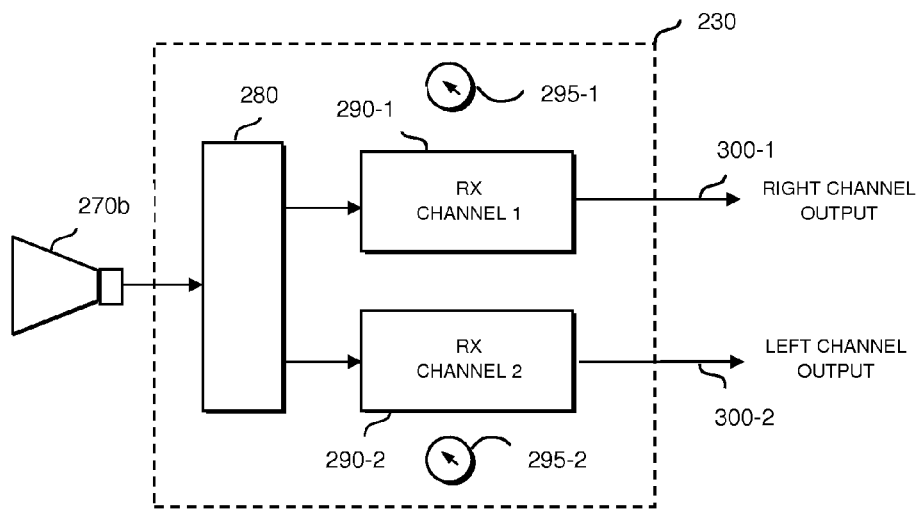
FIG. 4 is a functional block diagram of a wireless 3-D HDTV receiver unit of the invention.
Figure 5:
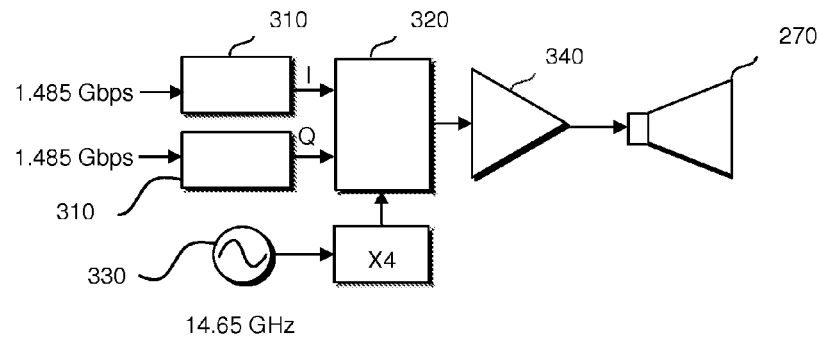
FIG. 5 is a functional block diagram of a dual HDSDI version of this invention using QPSK and a single carrier. Throughput=3 Gbps

A quadrature modulation such as QPSK, DQPSK, OQPSK can be used as well. With these modulations, two channels of HDSDI are digitally modulated onto a single carrier frequency by using one channel for the in-phase ("I") channel, and the second channel modulating the quadrature ("Q") channel. In this case, duplexer/splitters 280 and combiners 260 would not be used at each end since a single carrier frequency can carry both HDSDI channels. See FIG. 5.

Figure 6:
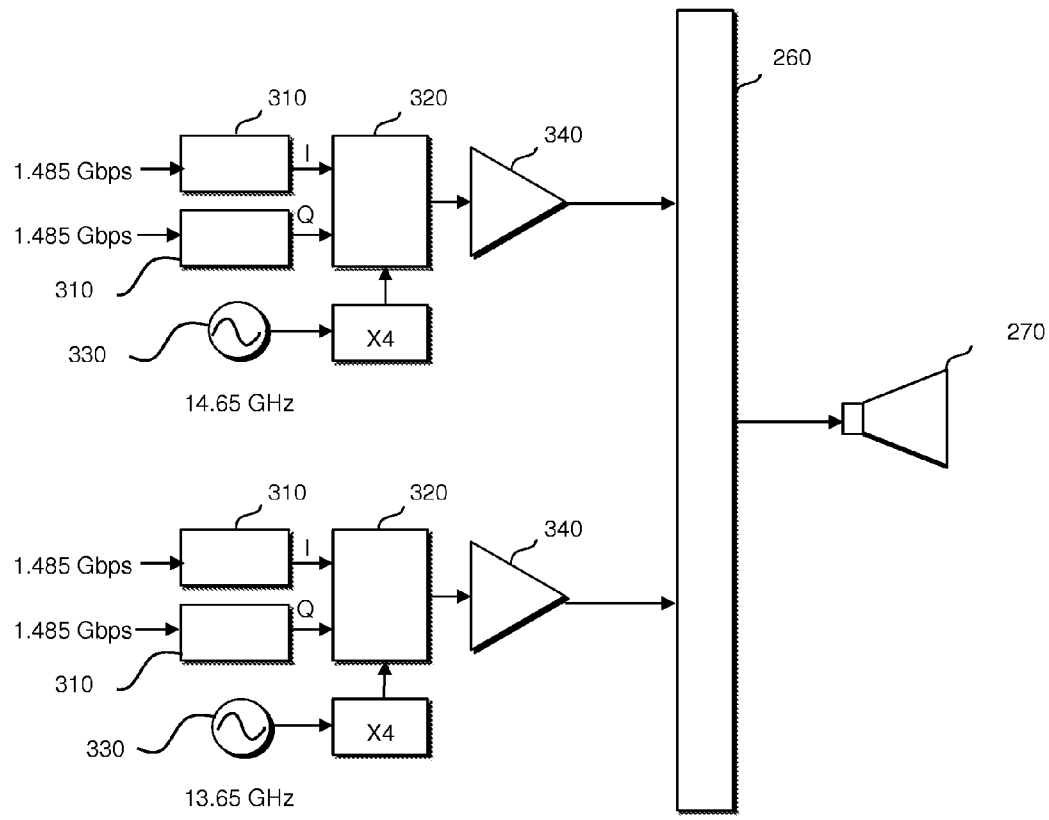
FIG. 6 is a functional block diagram of a quad HDSDI version of this invention using dual QPSK and two carriers. Throughput=6 Gbps

Alternately, 4 HDSDI channels could be carried by modulating 2 carriers, each carrier modulated by a QPSK, DQPSK, or OQPSK type of waveform such that each carrier is carrying two channels of HDSDI information as just described. In this case, duplexer/combiners 260 and duplexer/splitters 280 would again be used to combine the two QPSK modulated carriers at the transmitter unit 10 and split them at the receiver unit 170. See FIG. 6.

Figure 7:
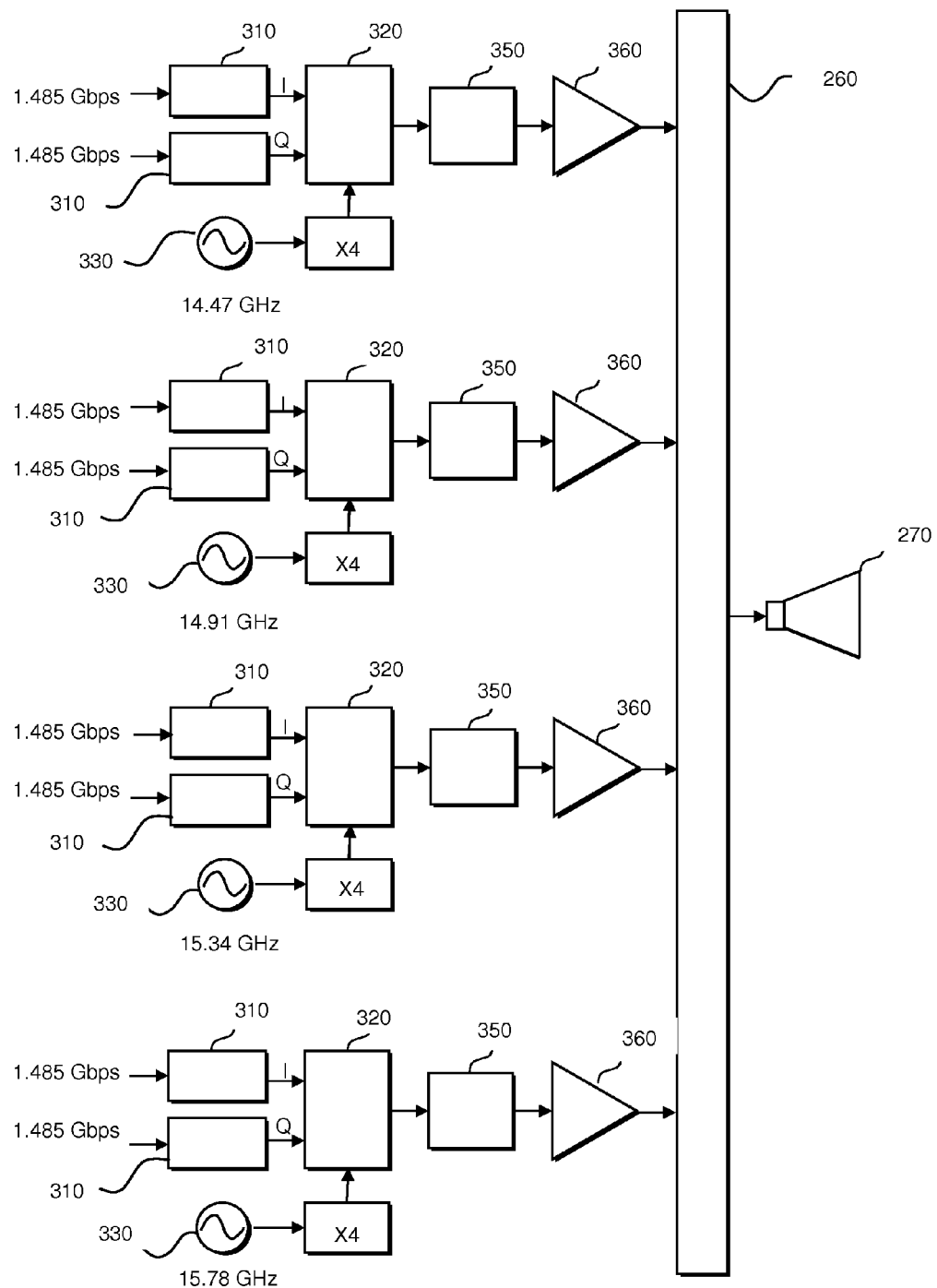
FIG. 7 is a functional block diagram of an 8× SMPTE 292M using same frequency band using bandpass-limited OQPSK to provide bandwdith efficient modulation and contstant envelope, allowing use of saturated amplifier for increased efficiency and cost reduction. Throughput=12 Gbps

As will be appreciated this can be scaled up to 8 channels as shown in FIG. 7.

Typically, an antenna 270a with a beamwidth that is between 3 and 8 degrees will be used in order that pointing is not critical, while at the same time providing adequate gain to close the link with an adequate range (typically 100 to 500 m). Furthermore, the beamwidth of the antenna 270a should be narrow enough that multiple systems can be deployed in the same vicinity without interference between them.

On the receive side 170, a similar antenna 270b receives the signal 60 and the antenna output is fed to a duplexer/splitter 280 or other mechanism to split the carriers. If QPSK, DQPSK, or OQPSK modulation is used, then a single carrier can be used without a duplexer/splitter 280 to carry two HDSDI channels.

The two (or more) channels are then demodulated from the digital waveforms and output as two (or more) independent HDSDI outputs 30-1a, 30-2a. These outputs 30-1a, 30-2a can then be used to display or store the 3-D (or multi-view) HDTV content on a 3-D HDTV, monitor, projector, or data storage device 190.

In order to keep the receive and transmit antennas 270a 270b pointed at one another, a pointing and tracking mechanism is used. Both the receive 270b and transmit 270a antennas are mounted on two-axis gimbals 70a, 70b which are controlled via computers 100a, 100b. The computers 100a, 100b use an algorithm to keep the antennas 270a, 270b pointed at one another. This algorithm keeps the antennas 270a, 270b pointed by searching for the position which maximizes the strength of the received carrier at the receivers 290-1, 290-2. Signal strength is detected with one or more signal strength meters 295-1, 295-2 in the receiver 230. The algorithm can work by several means. Primarily, it can be based on searching for maximum receive signal level, or by using position information to point the antennas 270a, 270b at one another, or a combination of the two. The attitude movement of the operator (azimuth, elevation, yaw, pitch) can also be corrected via chip gyros or through a 6-axis sensor 160.

To establish a baseline, the transmit and receive antennas 270a, 270b can be pointed at one another manually. Joysticks 150a, 150b can be used to conveniently point the antennas 270a, 270b. Video cameras 40a, 40b mounted in parallel with the horn antennas 270a, 270b can be used to visually aid in the pointing. Alternatively, the receive antenna 270b can be pointed manually, via the joystick 150b and the camera 40b, and the transmit antenna 270a can sequentially scan over azimuth and elevation until the maximum receive signal level is sensed. The receive signal level is sent to the transmitter 50 via a separate, low data rate link in order that it can be fed to the computer 100a which is searching for the maximum signal level. Alternatively the transmit antenna 270a could be pointed manually and the receive antenna 270b could search for the maximum received signal level to establish a baseline.

Alternatively, the baseline position could be established by sensing the relative positions of the transmitter 50 and receiver 230. This could be done via inertial navigation or via GPS, or by having an operator type in the locations manually.

Once the baseline pointing has been established, the algorithm alternates between adjusting the transmit 270a and receive 270b antennas to keep each antenna 270a, 270b pointed at the position which yields maximum received signal level. The algorithm performs this function on a continuous basis so that operator movement is continuously adjusted for.

Alternatively, the GPS and/or inertial navigation sensors 160 feed position coordinate data to the algorithm which then calculates the azimuth and elevation coordinates needed to point the two antennas 279a, 270b at one another while the operator is moving.

To account for platform movement, chip gyros or other azimuth, yaw, pitch sensors 160 are mounted on the transmit gimbal 70a. These sensors detect changes in attitude due to platform motion and feed this information to the algorithm so that this movement can be accounted for.

The algorithm is calculated on CPUs 100a and/or 100b. The CPUs 100a, 100b have access to the receive signal strength and are capable of controlling the transmitter 50 and receiver 230. The CPUs 100a, 100b also have access to the position sensor data and attitude sensor data at the transmitter 50 and receiver 230. The CPUs 100a, 100b could be located at the transmitter 50, at the receiver 230, or between them, or at a third location. The control of the transmitter antenna gimbal 70a, the receiver antenna gimbal 70a, the receive signal strength, the transmitter and receiver positions and attitude, are all communicated to and from the CPUs 100a, 100b via separate low-data rate (1 Mbps) wireless links on a licensed or unlicensed wireless band such as 2.4 Ghz or 5 Ghz ISM band. These links have a range in excess of 300 m.

Views of preferred embodiment of the invention are shown in FIGS. 1 through 4. The primary features of the preferred embodiment are as follows:

A wireless video camera transmitter unit 10 comprising:
Two HDTV cameras 20-1, 20-2 mounted side by side to digitize 3-D HD video and audio content. The cameras 20-1, 20-2 generate uncompressed digitized video output 30-1, 30-2. Typically the data rates of the uncompressed digitized video from each camera will be at a rate of 1.485 Gbps The two uncompressed digitized video outputs 30-1, 30-2 are then each modulated onto two separate carriers in the 60 GHz unlicensed band using OOK (On Off Keying) modulation.

The carriers are separated by enough bandwidth to avoid interference between them, and still fit within the allocated band. The carriers are amplified and the amplifier output is combined in a duplexer/combiner 260 to feed a single horn antenna 270a. The horn antenna 270a has a beamwidth of approximately 3 to 8 degrees. This beamwidth is narrow enough to provide the gain needed to close the link over the 100 m to 300 m range at low power, while at the same time is wide enough to facilitate mounting on a non-rigid platform such as a manpack. The relatively wide beamwidth of the horn antenna 270a allows for relaxed requirements on pointing accuracy, which translates into a cheaper, lighter pointing mechanism Alternately, the two carriers could be at the same frequency but separated by polarization.

In this case two antennas 270a one using horizontal and the other vertical polarization would be used.

Two modulators (incorporated in the transmitters 250-1, 250-2) modulate carriers in the 60 GHz unlicensed band Two power amplifiers (incorporated in the transmitters 250-1, 250-2) amplify the signals 30-2, 30-2.

A duplexer/combiner 260 combines the outputs to feed a single horn antenna 270a.

The horn antenna 270a is mounted on a two axis, motorized gimbal 70a.

A control processing unit 100a controls the motorized gimbal 70a and executes an autotracking algorithm to steer the horn antennas 270a, 270b so they are pointed at each other. The algorithm bases itself on feedback from a receive power indication received from the remote receiver unit 170 via a separate secondary radio telemetry link. The receive and transmit antennas 270a, 270b are adjusted alternately so that one is fixed while the other is adjusting for maximum signal strength.

Alternately, or in combination with the above described feedback algorithm, an algorithm that points the transmitter antenna 270a at the receiver antenna 270b based on position and attitude sensors is used.

The position sensors could be based on GPS data, or on inertial navigation sensors Gyro sensors 160 can be used to measure the yaw, pitch, and tilt of the operator wearing the wireless video camera, along a mechanism for feeding this digitized information to the control processing unit, to track out operator motion and keep the horn antenna 270a pointed toward the receive unit 170.

A 100 kbps wireless telemetry/control link connects the receive and transmit antenna pointing and tracking algorithms. The receive signal strength is transmitted from the receiver unit 170 to the transmitter unit 10 via this algorithm. Receiver and transmitter position data would also be communicated across this link. The link could use an unlicensed band such as 2.4 GHz, and could use a waveform such as the frequency hopping waveform of the Zigbee (IEEE 802.15.4) physical layer.

A remote receiver unit 170 comprising:

A horn antenna 270b mounted on a two axis, motorized gimbal 70b.

A duplexor/splitter 280 to split the two channels of HDSDI data.

A Channel 1 receiver 290-1 and a Channel 2 receiver 290-2 to provide the right and left channels of uncompressed HDSDI data A wireless telemetry/control link as described above.

A control processing unit 100b to control the motorized gimbal 70b and execute an autotracking algorithm to steer the horn antenna 270b so that it is pointed at the antenna 270a of the remote transmitter unit 10. The algorithm bases itself on feedback from receive carrier signal strength signal from one or both of the Channel 1 and Channel 2 receivers 290-1, 290-2.

Alternately, or in combination with the above described feedback algorithm, the algorithm can point the receiver antenna 270b at the transmitter antenna 270a based on position and attitude sensors. The position sensors could be based on GPS data, or on inertial navigation sensors Gyro sensors 160 to measure the yaw, pitch, and tilt of the receiver platform, and a mechanism for feeding this digitized information to the control processing unit compensates for operator motion and keeps the horn antenna 270b pointed toward the transmitter unit 10.

A 100 kbps wireless telemetry/control link to connect the receiver and transmitter antenna pointing and tracking algorithms. The receive signal strength would be transmitted from the receiver 170 to the transmitter 10 via this algorithm. Receiver and transmitter position data would also be communicated across this link. The link could use an unlicensed band such as 2.4 GHz, and could use a waveform such as the frequency hopping waveform of the Zigbee (IEEE 802.15.4) physical layer.

The following reference numerals are used on FIGS. 1 through 7:

10 is a wireless video transmitter unit of the invention.
20 is an HDTV Digital Camera.
30 is an SMPTE 292M HDSDI, preferably at 1.485 Gbps.
40 is a digital video camera.
50 is a two-channel transmitter.
60 is a video data link.
70 is a motor-controlled, pan and tilt gimbal.
90 is an analog to digital converter.
100 is a PC with autotracking algorithm, gimbal control, interface to RF link, and video display software.
110 is a RF Data/Control link.
120 is an antenna.
150 is a joystick.
160 is a chip gyro or a 6-axis sensor or a 3-D attitude sensor.
170 is a wireless video receiver unit of the invention.
190 is a 3-D HDTV, monitor, projector, or data storage device.
220 is an analog-to-digital converter.
230 is a two-channel receiver.
240 is an HDTV video camera.
250 is a transmitter.
260 is a duplexer/combiner.
270 is a horn antenna.
280 is a duplexer/splitter.
290 is a receiver.
295 is a signal strength meter
300 is an output video signal.
310 is a CDR
320 is a QPSK modulator
330 is a DRO
340 is an amplifier
350 is a bandpass filter
360 is a limiting amplifier.

In the figures like numbers indicate identical elements. In some cases to clarify the situation dash numbers and alphabetic suffixes have been added to these reference numbers. A "-1" indicates the first or right channel; a "-2" indicates the second or left channel; an "a" suffix indicates the transmitter unit; and a "b" suffix indicates the receive unit.

Thus, the present invention has been described herein with reference to a particular embodiment for a particular application. Those having ordinary skill in the art and access to the present teachings will recognize additional modifications, applications and embodiments within the scope thereof.

The invention claimed is:

1. An apparatus for transmission of uncompressed video signals comprising:
    a) at least one video camera outputting a video signal;
    b) a transmitter connected to said video camera;
    c) a transmit gimbal;
    d) a transmit horn antenna connected to said transmitter and mounted on said transmit gimbal;
    e) a receive gimbal located at a predetermined distance from said transmit gimbal and adapted to detect said transmit gimbal's position;
    f) a receive horn antenna mounted on said receive gimbal;
    g) a receiver connected to said receive horn antenna; and
    h) a first tracking means for tracking the position of said transmit gimbal and a second tracking means for tracking said receive gimbal.

2. An apparatus as claimed in claim 1 further comprising:
    a) a duplexer/combiner operatively connected to and positioned between said video camera and said transmit horn antenna; and b) a duplexer/splitter connected to said receive horn antenna.

3. An apparatus as claimed in claim 1 in which the beamwidth of said horn antennas is between 3 and 8 degrees.

4. An apparatus as claimed in claim 1 in which said tracking means operates by detecting the positions of said horn antennas which results in maximum signal strength.

5. An apparatus as claimed in claim 1 in which said tracking means operates by detecting the positions of said horn antennas in three dimensional space.

6. An apparatus as claimed in claim 1 in which said tracking means operates by detecting the change in location of said transmit horn antenna in three dimensional space.

7. An apparatus as claimed in claim 1 in which said tracking means comprises:
   a) position detecting means on said gimbals for detecting the positions of said gimbals;
   b) position controlling means on said gimbals for controlling the positions of said gimbals;
   c) a radio frequency transceiver;
   d) an antenna connected to said transceiver;
   e) a computer connected to said position detecting means, said position controlling means, said radio frequency transceiver; said transmitter and said receiver;
   f) software on said computer for sending and receiving data and control signals via said radio frequency transceiver; continuously detecting said positions of said gimbals; and continuously controlling said positions of said gimbals so that signal strength of said video data signal at said receiver is maximized.

8. An apparatus for transmission of uncompressed video signals comprising:
   a) a first video camera outputting a first video signal;
   b) a second video camera outputting a second video signal;
   c) a first transmitter connected to said first video camera;
   d) a second transmitter connected to said second video camera;
   e) a duplexer/combiner adapted to receive said first video signal, to receive said second video signal and to combine connected to said transmitters or said video cameras;
   said first and second video signals into a combined video data signal;
   f) a transmit gimbal;
   g) a transmit horn antenna mounted on said transmit gimbal;
   h) a receive gimbal located at a predetermined distance from said transmit gimbal and adapted to detect said transmit gimbal's position;
   i) a receive horn antenna mounted on said receive gimbal;
   j) a duplexer/splitter operatively connected to said receive horn antenna, adapted to receive said combined video data signal and adapted to split; said duplexer/splitter splitting said combined video data signal into said first video signal and said second video signal;
   k) a first receiver operatively connected to said receiver horn antenna and to said duplex/splitter; and
   l) a tracking means for tracking the position of said transmit gimbal and the position of said receive gimbal.

9. An apparatus as claimed in claim 8 in which the beamwidth of each of said transmit horn antenna and said receive horn antenna between 3 and 7 degrees.

10. An apparatus as claimed in claim 8 in which said tracking means operates by detecting the positions of said horn antennas which results in maximum signal strength.

11. An apparatus as claimed in claim 8 in which said tracking means operates by detecting the positions of said horn antennas in three dimensional space.

12. An apparatus as claimed in claim 8 in which said tracking means operates by detecting the change in location of said transmit horn antenna in three dimensional space.

13. An apparatus as claimed in claim 8 in which said tracking means comprises:
   a) transmit position detecting means on said transmit gimbal for detecting the positions of said transmit gimbal;
   b) receive position detecting means on said receive gimbal for detecting the positions of said receive gimbal;
   c) transmit position controlling means on said transmit gimbal for controlling the position of said transmit gimbal;
   d) receive position controlling means on said receive gimbal for controlling the position of said receive gimbal;
   e) a receive radio frequency transceiver;
   f) a transmit radio frequency transceiver;
   g) a receive antenna connected to said receive transceiver;
   h) a transmit antenna connected to said transmit transceiver;
   i) a transmit computer connected to said transmit position detecting means, said transmit position controlling means, said transmit radio frequency transceiver; said transmitter and said receiver;
   j) a receive computer connected to said receive position detecting means, said receive position controlling means, said receive radio frequency transceiver; and said receiver;
   k) software on said computers for sending and receiving data and control signals via said radio frequency transceiver; continuously detecting said positions of said gimbals;
   and continuously controlling said positions of said gimbals so that signal strengths of said video signals at said receiver is maximized.

14. A method for transmission of uncompressed video signals comprising the steps of:
   a) providing at least one video camera outputting a video signal;
   b) providing a transmitter;
   c) connecting said video camera to said transmitter;
   d) providing a transmit gimbal;
   e) providing a transmit horn antenna;
   f) mounting said transmit horn antenna on said transmit gimbal;
   g) providing a receive gimbal located at a predetermined distance from said transmit gimbal and adapted to detect said transmit gimbal's position;
   h) providing a receive horn antenna;
   i) mounting said receive horn antenna on said receive gimbal;
   j) providing a receiver connected to said receive horn antenna;
   k) providing a tracking means for determining the position of said transmit horn antenna, determining the position of said receive horn antenna and keeping said transmit horn antenna and said receive horn antenna continuously pointed at each other;
   l) capturing images with said video camera and outputting said images as a video signal;
   m) amplifying and modulating said video signal onto a microwave carrier in said transmitter to produce a video data signal;
   n) transmitting said video data signal from said transmit horn antenna;

o) receiving said video data signal at said receive horn antenna;
p) demodulating said video data signal in said receiver to provide a demodulated video data signal;
q) outputting said demodulated video data signal.

15. A method as claimed in claim 14 further comprising the steps of:
a) providing a duplexer/combiner;
b) connecting said duplexer/combiner between said video camera and said transmit horn antenna;
c) providing a duplexer/splitter;
d) connecting said duplexer/splitter after said receive horn antenna;
e) combining video signals in said duplexer/combiner; and
f) splitting video signals in said duplexer/splitter.

16. A method as claimed in claim 14 in which the beamwidth of said horn antennas is between 3 and 8 degrees.

17. A method as claimed in claim 14 in which said tracking system operates by detecting the positions of said horn antennas which results in maximum signal strength.

18. A method as claimed in claim 14 in which said tracking system operates by detecting the positions of said horn antennas in three dimensional spaces.

19. A method as claimed in claim 14 in which said tracking system operates by detecting the change in location of said transmit horn antenna in three dimensional space.

20. A method as claimed in claim 14 in which the step of keeping said horn antennas continuously pointed at each other comprises the steps of:
a) providing position detecting means;
b) attaching said position detecting means on said gimbals;
c) providing position controlling means;
d) attaching said position controlling means on said gimbals;
e) providing a radio frequency transceiver;
f) providing an antenna;
g) connecting said antenna to said transceiver;
h) providing a computer;
i) connecting said computer to said position detecting means, said position controlling means, said radio frequency transceiver; said transmitter and said receiver;
j) installing software on said computer for sending and receiving data and control signals via said radio frequency transceiver; continuously detecting said positions of said gimbals; and continuously controlling said positions of said gimbals;
k) sending and receiving data and control signals via said radio frequency transceiver; and
l) continuously detecting said positions of said gimbals; and continuously controlling said positions of said gimbals so that signal strength of said video data signal at said receiver is maximized.

* * * * *